Dec. 10, 1968  F. J. STODDARD ET AL  3,415,442
ISENTROPIC COMPRESSION TUBE
Filed Jan. 13, 1967  2 Sheets-Sheet 1

INVENTOR
FRANK J. STODDARD
JOHN G. HALL
ABRAHAM HERTZBERG

BY
AGENT.

INVENTOR
FRANK J. STODDARD
JOHN G. HALL
ABRAHAM HERTZBERG

AGENT.

United States Patent Office 3,415,442
Patented Dec. 10, 1968

3,415,442
ISENTROPIC COMPRESSION TUBE
Frank J. Stoddard, Depew, and John G. Hall, East Aurora, N.Y., and Abraham Hertzberg, Bellevue, Wash., assignors to Cornell Aeronautical Laboratory, Inc., Buffalo, N.Y., a corporation of New York
Filed Jan. 13, 1967, Ser. No. 609,054
7 Claims. (Cl. 230—54)

ABSTRACT OF THE DISCLOSURE

A compression tube that develops high velocity gas flows by means of a substantially isentropic compression process. The isentropic compression is achieved by a piston unit that is designed to follow a natural trajectory in response to an initial predetermined pressure differential thereacross.

Background of the invention

The present invention relates to compression tubes and, more particularly, to compression tubes that develop the very high velocity gas flows required for the simulation or duplication of environmental conditions for accurate testing of various high velocity vehicles.

Conventional shock tube facilities currently in use, while capable of producing the very high velocities that are encountered by supersonic or hypersonic vehicles are generally not capable of duplicating the ambient environmental conditions confronting such vehicles. This is due, inter alia, to the temperature increases associated with the nonisentropic shock waves which cause significant dissociation of the test gas. Thus, in situations where the desired ambient stream composition is that of ordinary air, which is appropriate to atmospheric flight over a wide altitude range, the conventional shock tube is subject to severe limitations.

In addition to the dissociation problem, conventional shock tubes would not be capable of duplicating the reentry conditions of a typical lunar mission vehicle. While, theoretically, a shock tube would be capable of generating reentry velocities, the cost of a facility to contain the static pressures involved would be prohibitive, in that very high static reservoir pressures are required to develop the necessary stagnation velocities in the test section.

Summary of the invention

In overcoming the above mentioned limitations of the prior art, the present invention provides a compression tube that is capable of driving gases to high velocities with negligible dissociation and containable static pressures. To these ends, means are provided for achieving substantially isentropic compression of the gases. Contrasted with shock compression, isentropic compression is characterized by lower temperature increases, for a given pressure increase, and therefore will lead to much less dissociation of the test gas. In addition, the expansion waves associated with the isentropic compression according to the present invention will function to significantly increase the stagnation pressure of the test gas whereby the reservoir need contain a lower static pressure, as compared with the shock tube pressures.

The structure for producing the isentropic compression comprises; means defining a varying area tube having an upstream section terminating in a reduced diameter downstream section, piston means slidably movable in said upstream section, means for restraining said piston means against movement, means for establishing a predetermined pressure differential across said piston means, means for releasing said piston means to permit acceleration thereof towards said downstream section in response to said pressure differential, and means for establishing a substantially constant pressure downstream of said piston means in said upstream section as said piston means approaches the termination of said upstream section.

Description of the preferred embodiment

Figure 1:
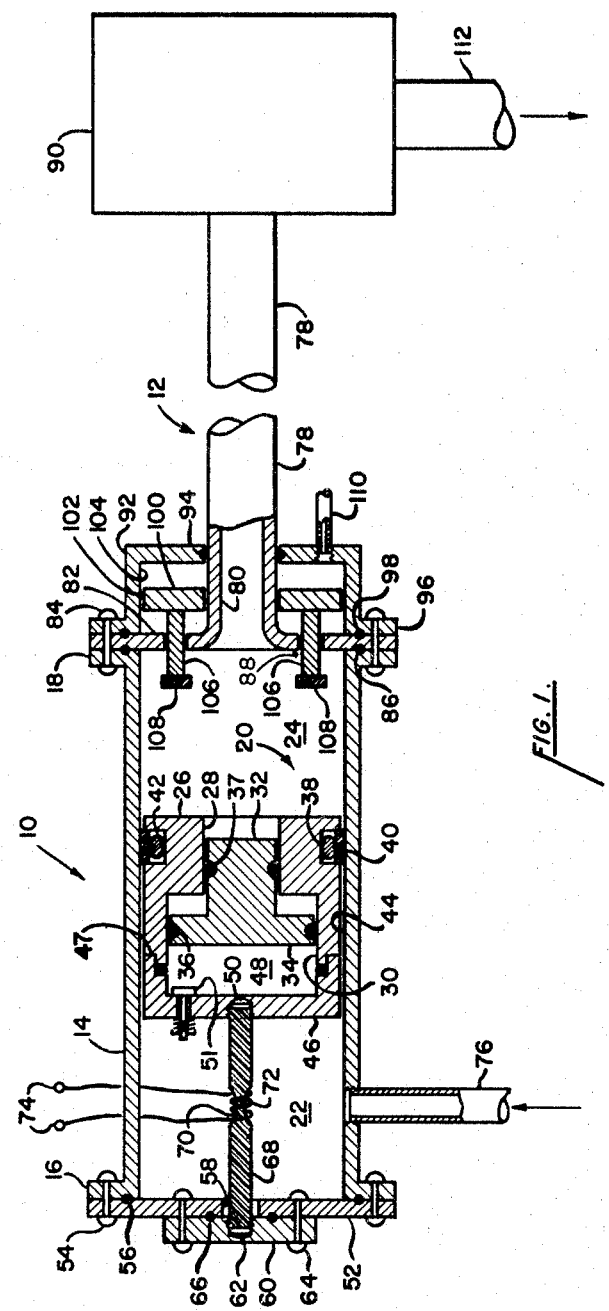
FIGURE 1 is an elevational view of the compression tube according to the present invention with parts thereof shown in section.

Referring now to the drawings and more particularly FIGURE 1, the compression tube is shown generally as comprising two main sections, a driver section 10 and a driven section 12.

The driver section 10 is an elongated cylindrical pipe or tube 14 having opposed end flanges 16 and 18, respectively. Slidingly and sealingly mounted interiorly of pipe 14 is a piston unit 20 dividing the interior of pipe 14 into a driving chamber 22 and a driven chamber 24.

Piston unit 20 is shown as comprising an outer hollow cylindrical piston 26 having a reduced diameter opening 28 facing chamber 24 leading to an enlarged diameter inner wall 30. An inner piston 32 slidable in opening 28 has an end flange 34 integral therewith that is in sliding engagement with inner wall 30. Suitable sealing means in the form of O-rings 36 and 37 are carried by flange 34 and piston 32, respectively, in sealing contact relation with corresponding wall 30 and opening 28. An annular groove 38 is located on the peripheral surface of outer piston 26 for receiving and retaining a piston sealing band 40 made of polytetrafluoroethylene or the like and a rubber O-ring expander 42 for urging band 40 into sealing contact with the interior wall 44 of pipe 14. Piston 26 is closed by a generally planar end 46 that is suitably sealingly attached thereto as at 47. End 46 faces chamber 22 and defines with flange 34 an inner chamber 48. End 46 contains a central threaded blind bore 50. Spaced from opening 50 in end 46 is an inlet valve 51 which functions, as will become apparent hereinbelow, to allow chamber 48 to become pressurized.

An end plate 52 is bolted and sealed to pipe flange 16 as indicated at 54 and 56, for isolating chamber 22 from the environment. A central opening 58 is provided in plate 52. A retaining plate 60 containing a central threaded blind bore 62 is fixedly and sealingly mounted to end plate 52 by means of bolts 64 and seal ring 66. A generally cylindrical member 68 is sealingly and threadedly received in bores 50 and 62 for restraining piston 26 against movement. A central reduced diameter portion 70 of member 68 is adapted to break thereby releasing piston 26. To this end, member 68 and more particularly portion 70 may be fabricated of a suitable heat responsive material such as a glass reinforced nylon. Wrapped about portion 70 is a heating coil 72 having leads 74 leading to a suitable source of current (not shown) for triggering the breakage thereof at the proper pressure differential. It is to be emphasized that heat responsive member 68, 70 is shown for illustrative purposes only and that any type of means for releasing piston 26 in response to a predetermined pressure differential would suffice. A line 76 is provided in fluid communication with chamber 22 for delivering high pressure fluid thereto from a suitable source (not shown); such communication being suitably controlled by a valve means, or the like (not shown).

The driven section 12 comprises an elongated cylindrical tube 78 having an internal flow passage 80, the diameter of which is smaller than that of interior wall 44 of pipe 14. However, for illustrative purposes only, the diameter of passage 80 is shown greatly exaggerated. Passage 80 is in fluid communication with chamber 24. A flanged end 82 of tube 78 is sealingly and fixedly secured to flange 18 of pipe 14 by means of bolts 84 and seal ring 86. Flanged end 82 has a plurality of axially extending through bores 88 located radially outwardly of passage 80, but inside the diameter of wall 44. The end of tube 78 remote from flange 82 communicates with a dump tank 90 and may be secured thereto by a conventional slip joint (not shown) to accommodate longitudinal movement of the tube.

An annular dash-pot housing 92 is slidably mounted at one end about driven tube 78 and makes sealing contact therewith by means of seal ring 94. A flange 96 at the other end of housing 92 is bolted at 84 and sealed at 98 against the face of flange 82 that is opposite flange 18. A piston member 100, annular in shape, is contained within the housing 92 and slidably mounted about tube 78. The outer periphery 102 of piston 100 is spaced with slight clearance from the interior 104 of housing 92 to define a fluid retarding restricted passageway. Projecting from piston 100 and slidably extending through the bores 88 into chamber 24 are a plurality of pins 106. Resilient cushion pads 108 are suitably fixed to the end of each pin. The interior of dash-pot housing 92 is filled with a suitable liquid supplied through fitting 110 from a liquid reservoir or the like (not shown). It is to be understood that the foregoing dash-pot structure is presented for only illustrative purposes.

A pipe 112 communicates with dump tank 90 for connecting passage 80 and chamber 24 with a suitable vacuum source (not shown); the communication being suitably controlled by valve means or the like (not shown).

In operation, a predetermined pressure differential is established across piston 26 by supplying high pressure gas, air for example, to chamber 22 through line 76 and rarifying the air in chamber 24 by means of vacuum line 112. The piston 26 is held stationary against the increasing pressure differential thereacross by member 68. In addition, before assembly, chamber 48 is pressurized through valve 51 to a pressure in excess of the pressure in chamber 22. The exact pressure differential across piston 26 for any set of desired conditions in the test section of tube 78 depends upon the particular gases employed, the lengths of tubes 14 and 78, the area or contraction ratios thereof as well as the mass of piston unit 20, as will become apparent hereinbelow. At the desired pressure differential the heat of coil 72 will cause breakage of member 68 at section 72 permitting the piston unit 20 to accelerate toward the driven section 12. As is apparent, the movement of the piston 26, except for the slight friction between it and the interior wall 44, is free from external controls or restraints and therefore follows a natural trajectory. The significance of this is that substantially all (except for the portion absorbed by the dash-pot) of the expansion energy of the driver gas in chamber 22 is transferred to the driven gas in chamber 24.

Figure 2:
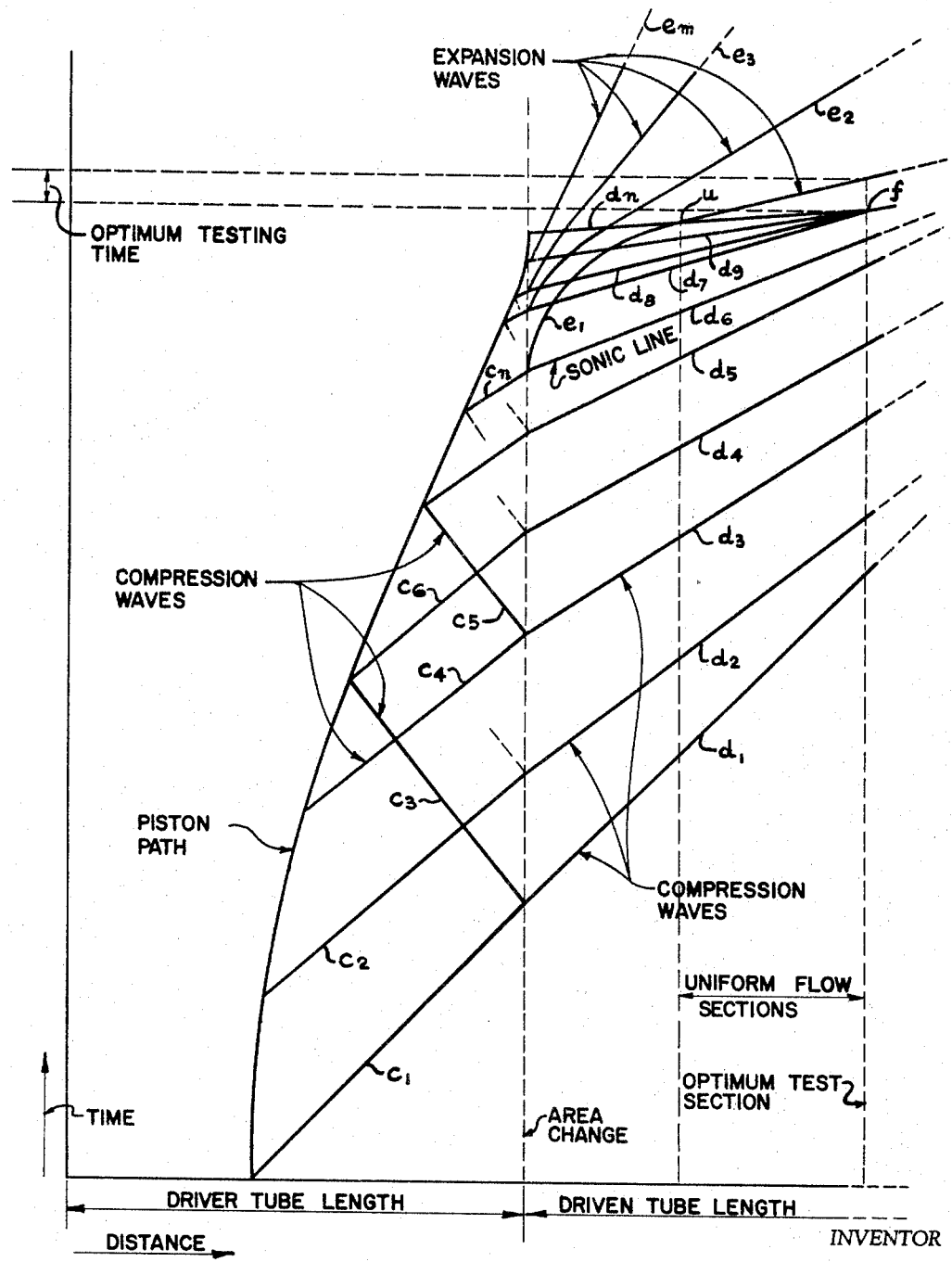
FIGURE 2 is a simplified wave diagram for illustrating the operation of the apparatus of FIGURE 1.

As piston unit 26 accelerates with gradually increasing velocity, overcoming the inertia due to the mass thereof, families of compression waves are generated which reflect back and forth between the piston face and the area change at flange 82. These compression waves, depicted at $c_1, c_2, c_3 \ldots c_n$ in FIGURE 2, function, as is well known, to increase the pressure and density of the gas in chamber 24. As shown at $d_1, d_2, d_3 \ldots d_n$ in FIGURE 2, the compression waves are also transmitted through small tube passage 80. The manner in which these compression waves are generated due to the natural trajectory of the piston and the chosen length of small tube passage 80 is such that no substantial coalescense of these waves occurs to generate undesirably strong shock waves. While some of the initial compression waves may coalesce to form weak shocks, this does not change the isentropic character of the overall compression (provided such compression is sufficiently slow due to the mass of the piston and the pressure differential thereacross) in that these weak shocks affect only the very small mass of air existing initially in passage 80 as compared to the volume of gas in chamber 24. It is to be noted that the line representations of the compression waves as shown in FIGURE 2 are taken at sufficient intervals that the coalescence leading to the weak shocks is not shown.

As the pressure and density increase in chamber 24, the flow at the entrance of passage 80 increases. Ultimately, the Mach number at the entrance reaches its limiting value of 1 and additional waves, $e_1, e_2, e_3 \ldots e_m$ arise which propogate downstream into the tube passage 80. These waves are expansion waves which arise from the condition that the flow sufficiently near the test section, identified infra, must become supersonic eventually, while sonic flow is the limiting condition at the entrance of the small diameter tube.

It is to be emphasized that the processes described are all transient or nonsteady and are not subject to the rules governing the steady state flow of gases. In fact, as is well known to those skilled in the art, the diagram shown in FIGURE 2 is an approximation of the nonsteady processes involved along the lengths of the driver and driven tubes as a function of time. To simplify the presentation and understanding of the operations an infinite area or contraction ratio has been assumed between driver tube 14 and driven tube 78. For the large area ratios contemplated this assumption is close enough.

Meaningful tests can only be taken at those portions of the smaller tube where uniform flow exists for a long enough time. Referring to FIGURE 2, it can be seen that the flow is uniform at the section of the smaller tube where the last compression wave $d_n$ overtakes the first expansion wave $e$, point $u$, to the section where the compression waves coalesce, point $f$. As is apparent, the optimum testing time begins at the time point $f$ is established and the optimum test section is located at this point $f$ along the length of tube 78.

In order for the structure of the present invention to be capable of producing such uniform flow, the overpressure produced when piston 26 impacts against pads 108 and continues to move forward must be suppressed. This is achieved by causing the volume of chamber 24 to increase as the forward movement of piston 26 is retarded upon impact with the dash-pot structure through pads 108. To this end, inner piston 32 under the influence of the higher pressure existing in chamber 24 is urged toward end 46 of outer piston 26. Thus the tendency for the pressure in chamber 24 to rise above the limit necessary to produce the focussed compression at $f$ in FIGURE 2 is offset by the increase in volume of the chamber. As is apparent, the overpressure referred to is undesirable since it would produce shock waves that by overtaking the first expansion waves would end the isentropic nature of the compression and destroy the uniform flow period. After piston 26 impacts against pads 108 and comes to rest, it starts to move towards the left as viewed in FIGURE 1 thereby tending to increase the volume of chamber 24 and lowering the pressure therein. This reduction in pressure is prevented by movement of inner piston 32 towards the right under the influence of the higher pressure existing in chamber 48. The net effect is to keep the volume of chamber 24 substantially constant resulting in a substantially constant pressure therein. Such pressure reductions or underpressures are undesriable in that they would generate expansion waves that would overtake the last compression wave, $d_n$ with a resultant decrease in the duration of the uniform flow conditions. As is apparent, in order for inner piston 32 to perform its regulatory function, the volume of chamber 48 must be greater than the volume of chamber 24 when the outer piston comes to rest. The inner piston 32 will finally come to an equilibrium condition as determined by the pressure acting on the face thereof and the established predetermined pressure in chamber 48.

In addition to maintaining a test flow at section $f$ in FIGURE 2 that experiences no substantial dissociation, the flow as it passes the expansion waves, $e$, undergoes an increase in stagnation pressure. This is because the rate at which the static pressure decreases is more than offset by the increasing Mach number. The significance of this is that the tube does not have to contain extremely high static pressures.

It has been determined that flows at section $f$ lasting for about $100 \times 10^{-6}$ seconds at 30,000 ft./sec. could be produced with a large tube to small tube area ratio of 300 to 1 at a point in the small tube 100 feet downstream from the area change in an overall tube length of 200 feet.

Whereas the foregoing description has centered about the isentropic compression tube as applied to the similation of duplication of flight conditions, it need not be limited to such applications. For example, the tube according to the present invention may be used in gun tunnel studies or even as in improved driver for gas-driven guns. It is thus apparent, that those skilled in the art will develop other modifications; therefore, it is intended that the present invention be limited only by the scope of the appended claims.

We claim:
1. An isentropic compression tube, comprising;
   (a) means defining a varying area tube having an upstream section terminating in a reduced diameter downstream section,
   (b) piston means slidably movable in said upstream section,
   (c) means for restraining said piston means against movement,
   (d) means for establishing a predetermined pressure differential across said piston means,
   (e) means for releasing said piston means to permit acceleration thereof towards said downstream section in response to said pressure differential, and
   (f) means for establishing a substantially constant pressure downstream of said piston means in said upstream section as said piston means approaches the termination of said upstream section.
2. The isentropic compression tube according to claim 1 further comprising;
   (g) retarding means adjacent said downstream section for cushioning the impact of said piston means upon arrival at said termination of said upstream section.
3. The isentropic compression tube according to claim 1 wherein;
   (g) said piston means comprises an outer hollow cylindrical piston member having an opening in a downstream face thereof leading to a cylindrical inner wall, and
   (h) said means for establishing a substantially constant pressure comprises; an inner piston chamber in slidable engagement with said opening and said cylindrical inner wall.
4. The isentropic compression tube according to claim 3 further comprising;
   (i) retarding means adjacent said downstream section for cushioning the impact of said piston means upon arrival at said termination of said upstream section.
5. The isentropic compression tube according to claim 4 wherein;
   (j) said means for restraining said piston means comprises a heat responsive member affixed to said outer piston member and an end wall of said upstream section, and
   (k) said means for releasing said piston means comprises means to heat a central reduced diameter portion of said heat responsive member.
6. The isentropic compression tube according to claim 3 wherein;
   (i) said inner and outer piston members define therebetween a chamber that is pressurized in excess of the pressure existing upstream of said piston members.
7. An isentropic compression tube, comprising;
   (a) means defining a varying area tube having an upstream section terminating in a reduced diameter downstream section, containing a gaseous medium,
   (b) piston means slidably movable in said upstream section, and
   (c) means for driving said piston means in such a manner that the series of compression waves generated as the piston means approaches the termination of said upstream section coalesce at a single point.

References Cited
UNITED STATES PATENTS

| | | | |
|---|---|---|---|
| 2,546,965 | 4/1951 | Bodine | 60—247 |
| 2,688,514 | 9/1954 | Oishei et al. | 103—48 XR |
| 3,027,711 | 4/1962 | Rae | 230—1 XR |

ROBERT M. WALKER, *Primary Examiner.*

U.S. Cl. X.R.

230—69; 116—137